US007862918B2

(12) United States Patent
Matsuda et al.

(10) Patent No.: US 7,862,918 B2
(45) Date of Patent: Jan. 4, 2011

(54) RECORDING MEDIUM AND SHEET

(75) Inventors: Tsukasa Matsuda, Kanagawa (JP); Eizo Kurihara, Kanagawa (JP); Shoji Yamaguchi, Kanagawa (JP); Kunihiro Takahashi, Kanagawa (JP); Mario Fuse, Kanagawa (JP); Tomofumi Tokiyoshi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 270 days.

(21) Appl. No.: 11/826,918

(22) Filed: Jul. 19, 2007

(65) Prior Publication Data

US 2008/0018674 A1 Jan. 24, 2008

(30) Foreign Application Priority Data

Jul. 21, 2006 (JP) ............................. 2006-199264

(51) Int. Cl.
*B32B 17/08* (2006.01)
*B32B 15/12* (2006.01)

(52) U.S. Cl. .................... 428/838; 162/140; 428/537.5; 428/464; 283/82

(58) Field of Classification Search ....................... None
See application file for complete search history.

(56) References Cited

U.S. PATENT DOCUMENTS 4,639,278 A * 1/1987 Makino et al. .............. 148/108
4,660,025 A 4/1987 Humphrey .................. 340/572
6,270,591 B2 8/2001 Chiriac et al. ............... 148/300
6,747,559 B2 6/2004 Antonenco et al. ....... 340/572.1
2007/0178261 A1* 8/2007 Levy et al. ................. 428/34.2

FOREIGN PATENT DOCUMENTS

| | | |
|---|---|---|
| JP | 10-143708 | 6/1998 |
| JP | 2001-265183 | 9/2001 |
| JP | 2004-285524 | 10/2004 |
| JP | 2005-213654 | 8/2005 |
| JP | 7-032778 | 2/2007 |

OTHER PUBLICATIONS

English Machine translation of JP 2005-273023, Japan 2005.*
R.C. O'Handley, "Domain wall kinetics in soft ferromagnetic metallic glasses", Journal of Applied Physics, vol. 46 No. 11, Nov. 1975, pp. 4996-5001.
J. Yamasaki, et al., "Large Barkhausen discontinuities in Co-based amorphous wires with negative magnetostriction", Journal of Applied Physics, vol. 63 No. 8, Apr. 15, 1988, pp. 3949-3951.
Bo Bian & David E. Laughlin, *Fabrication and nanostructure of oriented FePt particles*, 87(9) J. of Applied Physics 6962-64 (2000).
Robert C. O'Handley, Modern Magnetic Materials 20-23 (2000).
K. J. Sixtus & L. Tonks, *Propagation of Large Barkhausen Discontinuities*, 37 Physical Rev. 930-58 (1931).

(Continued)

*Primary Examiner*—Holly Rickman
(74) *Attorney, Agent, or Firm*—Morgan, Lewis & Bockius LLP

(57) ABSTRACT

A recording medium includes a magnetic material and a pulp-fiber, a minimum value of shortest distances between the magnetic material and an edge of the recording medium substantially parallel to the pulp-fiber orientation direction being about 1 mm or more.

15 Claims, 5 Drawing Sheets

100
X1
120A
A
X2
120B
110
X3
120C

OTHER PUBLICATIONS

K. Mohri et al., *Large Barkhausen Effect and Matteucci Effect in Amorphous Magnetostrictive Wires for Pulse Generator Elements*, MAG-21(5) IEEE Transactions on Magnetics 2017-19 (1985).

http://www.physics.queensu.ca/~lynann/mbnoise.html (last visited Jul. 7, 2010).

* cited by examiner

RECORDING MEDIUM AND SHEET

CROSS-REFERENCE TO RELATED APPLICATION

This application claims priority under 35 USC 119 from Japanese Patent Application No. 2006-199264, the disclosure of which is incorporated by reference herein.

BACKGROUND

1. Technical Field

The present invention relates to a recording medium and a sheet containing a magnetic material that allow printing with a common recording material such as toner or ink and that also enable recording and reproduction of information by magnetic means.

2. Related Art

Recently, more laws and regulations have been established for prevention of information leakage, such as those concerning protection of private information, privacy marks, information security, and others. However, it is still difficult to completely prevent leakage of information such as private and confidential information printed on recording paper, because printed paper is easy to physically remove and stow away. Thus, there is an urgent need for a method of preventing leakage and forgery of confidential information recorded on recording paper while also preserving the convenience of use of recording paper.

SUMMARY

According to an aspect of the present invention, there is provided a recording medium, comprising: a magnetic material and a pulp-fiber, a minimum value of shortest distances between the magnetic material and an edge of the recording medium substantially parallel to the pulp-fiber orientation direction being about 1 mm or more.

DETAILED DESCRIPTION

Figure 1:
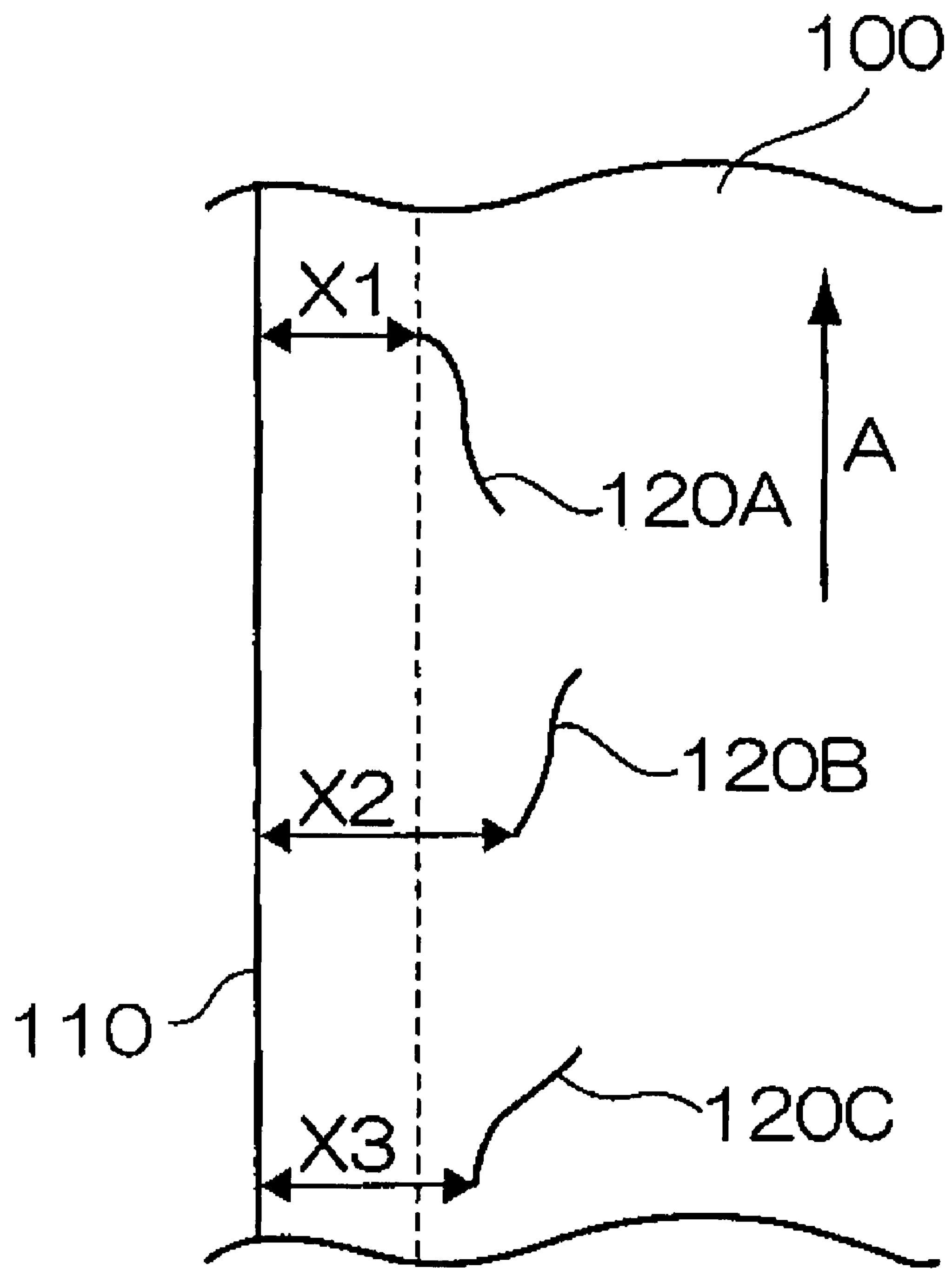
FIG. 1 is a schematic view explaining the magnetic material present in the area close to an edge of the recording medium parallel to the pulp-fiber orientation direction and the method of determining the shortest distance to the edge.

The invention includes the following embodiments.

<1> A recording medium, comprising: a magnetic material and a pulp-fiber, a minimum value of shortest distances between the magnetic material and an edge of the recording medium substantially parallel to the pulp-fiber orientation direction being about 1 mm or more.

<2> The recording medium according to item <1>, wherein the magnetic material is not substantially exposed at a surface of the recording medium.

<3> The recording medium according to item <1>, wherein the minimum value of shortest distances between a surface of the recording medium and the magnetic material is about 5 μm or more.

<4> The recording medium according to item <1>, wherein the minimum value of shortest distances between a surface of the recording medium and the magnetic material is about 8 μm or more.

<5> The recording medium according to item <1>, wherein the magnetic material has a Large Barkhausen Effect.

<6> The recording medium according to item <5>, wherein the magnetic material is a linear material having a length in a range of about 10 to about 350 mm and a diameter in a range of from about 20 to about 60 μm.

<7> The recording medium according to item <6>, wherein the magnetic material is a linear material having a diameter in a range of from about 20 to about 50 μm.

<8> The recording medium according to item <5>, wherein the magnetic material is a belt-shaped material.

<9> The recording medium according to any one of items <1> to <8>, wherein the magnetic material has a Fe—Co—Si-based amorphous magnetic material as its basic component.

<10> The recording medium according to any one of items <1> to <8>, wherein the magnetic material has a Co—Fe—Ni-based amorphous magnetic material as its basic component.

<11> The recording medium according to item <1>, comprising two or more layers.

<12> The recording medium according to item <1>, comprising two or more layers, wherein the magnetic material is placed at an interface between the layers.

<13> The recording medium according to item <1>, comprising a paper substrate of three or more layers, wherein the magnetic material is contained in a layer other than an outermost layer, or is contained between the layers, of the paper substrate.

<14> The recording medium according to any one of items <1> to <13>, wherein the ratio of the ultrasonic propagation velocity in a pulp-fiber orientation direction to the ultrasonic propagation velocity in a direction perpendicular to the pulp-fiber orientation direction (ultrasonic propagation velocity in the pulp-fiber orientation direction/ultrasonic propagation velocity in the direction perpendicular to the pulp-fiber orientation direction) is about 1.1 or more.

<15> The recording medium according to any one of items <1> to <14>, wherein the pulp-fiber is impregnated or thermally fused with a synthetic resin selected from the group consisting of polyethylene, polypropylene, polystyrene, polyvinyl chloride, polyester.

<16> A sheet containing a magnetic material and a pulp-fiber, and comprising a first region including the magnetic material and a second region not including the magnetic material, the respective regions extending in a belt-shape in a direction substantially parallel to the pulp-fiber orientation direction and being formed alternately in a direction substantially perpendicular to the pulp-fiber orientation direction, the width of a second region formed between two neighboring first regions being about 2 mm or more.

The recording medium according to an exemplary embodiment of the present invention characteristically contains a magnetic material and a pulp-fiber, a minimum value of shortest distances between the magnetic material and an edge of the recording medium substantially parallel to the pulp-fiber orientation direction being about 1 mm or more.

The minimum value of shortest distances between the magnetic material and an edge of the recording medium substantially parallel to the pulp-fiber orientation direction (hereinafter, referred to briefly as "edge") should be 1 mm or more, or about 1 mm or more, but the requirement should be satisfied at the both edges. The minimum value of shortest distances between the magnetic material and the edge is preferably 2 mm or more, or about 2 mm or more, preferably 3 mm or more or about 3 mm or more. When the minimum value of shortest distances between the magnetic material and the edge is less than 1 mm or about 1 mm, separation of the magnetic material occurs during conveyance of the recording medium.

However, an excessively large shortest distance between the magnetic material and the edge may lead to restriction of the region in the recording medium where the magnetic material is contained as dispersed. Accordingly, practically, the minimum of shortest distances between the magnetic material and the edge is preferably 70 mm or less, or about 70 mm or less.

The recording medium according to an exemplary embodiment of the present invention is square in shape, and the pulp-fiber is oriented in along a pair of sides of the recording medium mutually parallel to each other [i.e., in MD direction of the recording medium (direction of the paper travelling in paper machine) or in the CD direction (direction perpendicular to the traveling paper in paper machine)]. The state where the "pulp-fiber is oriented" means any state except the state where the pulp-fiber is isotropically oriented in the direction parallel to the plane of the recording medium.

When the ultrasonic propagation velocity in MD direction of the recording medium (paper-travelling direction in paper machine) is compared with that in the recording-medium CD direction (direction perpendicular to the traveling paper in paper machine), the pulp-fiber orientation direction is the direction higher in the ultrasonic propagation velocity, and when the ultrasonic propagation velocity in both directions are the same as each other, the pulp-fiber is in a completely isotropic state. The ultrasonic propagation velocity can be determined by using a Sonic Sheet Tester (manufactured by Nomura Shoji Co., Ltd.).

Increase in the ratio of ultrasonic propagation velocity in the pulp-fiber orientation direction to the ultrasonic propagation velocity in the direction perpendicular to the pulp-fiber orientation direction (ultrasonic propagation velocity in the pulp-fiber orientation direction/ultrasonic propagation velocity in the direction perpendicular to the pulp-fiber orientation direction) leads to easier separation of the magnetic material contained in the terminal area of the bases in the direction in parallel with the pulp-fiber orientation direction for example by the stress applied during conveyance of the recording medium. However, in an exemplary embodiment of the present invention, because the magnetic material is contained in the area separated from the terminal by a shortest distance of 1 mm or more, or about 1 mm or more, the magnetic material may not be separated, independently of the ratio of ultrasonic propagation velocity in the pulp-fiber orientation direction/the ultrasonic propagation velocity in the direction perpendicular to the pulp-fiber orientation direction.

For the reasons described above, as for the orientation state of the pulp-fiber in recording medium represented by the ultrasonic propagation velocity ratio in an exemplary embodiment of the present invention, the ratio of the ultrasonic propagation velocity in the pulp-fiber orientation direction/the ultrasonic propagation velocity in the direction perpendicular to the pulp-fiber orientation direction is preferably 1.1 or more, about 1.1 or more, more preferably 1.2 or more, or about 1.2 or more. The upper limit of the ultrasonic propagation velocity ratio is not particularly limited, but practically 2.7 or less, or about 2.7 or less.

Because the pulp-fiber orientation direction normally corresponds to MD direction of the recording medium, the ratio of the ultrasonic propagation velocity in the pulp-fiber orientation direction/the ultrasonic propagation velocity in the direction perpendicular to the pulp-fiber orientation direction means a so-called fiber orientation ratio (ultrasonic propagation velocity in the MD direction/ultrasonic propagation velocity in the CD direction).

The position of the magnetic material in a direction parallel to the plane of the recording medium is determined by examining the orientation direction of the pulp-fiber contained in the recording medium by the ultrasonic propagation velocity method described above and observing the magnetic material present in the area close to the edge of the recording medium parallel to the pulp-fiber orientation direction. Specifically, the magnetic material region and the non-magnetic region (containing no magnetic material) in the image of the recording medium obtained by a scanner were binarized with image-processing software (for example, DIPP-98, manufactured by Detect Co., Ltd.) [for binarization method, see "Automatic threshold level selecting method, based on judgment and least square standard" (J. Institute of Electronics, Information and Communication Engineers, Vol. J63-D, No. 4, pp. 349 to 356), "Basis and application of digital image processing" (Koichi Sakai)], and the position of the magnetic material (mm) in the direction perpendicular to the edge sides from the edge sides of the recording medium parallel to the pulp-fiber orientation direction (edges of two sides) was determined. Normally a linear magnetic material is used in an exemplary embodiment of the present invention, and thus, a region closest to the edges of the recording medium parallel to the pulp-fiber orientation direction in a magnetic material was used as an initial point in determining the shortest distance between the edge and the magnetic material. The measurement was repeated for all magnetic material particles present in the area close to the edge, and the smallest value (minimum value) was obtained.

FIG. 1 is a schematic view explaining the magnetic material present in the area close to an edge of the recording medium parallel to the pulp-fiber orientation direction and the method of determining the shortest distance to the edge, and in the Figure, 100 represents a recording medium; 110 represents an edge; and 120A, 120B, and 120C represent magnetic materials, and an arrow A indicates the direction of the orientation of the pulp-fiber (not shown in Figure). In a case where measuring object materials are only three magnetic materials shown in the Figure, as shown in the Figure, each shortest distance X1, X2, or X3 between the edge and each magnetic material 120A, 120B, or 120C is determined, and the smallest value among them (X1) was obtained as the minimum.

The recording medium according to an exemplary embodiment of the present invention may be prepared without processing in a cutting step, but is normally, preferably a so-called cut sheet prepared in a cutting step of cutting a large-size sheet. In such a case, the cutting-edge of the recording medium in an exemplary embodiment of the present invention means the cutting face. The cutoff step includes all cutting processes carried out before the recording medium according to an exemplary embodiment of the present invention is provided to the user who uses it for image formation.

The cutting step is not particularly limited, and, for example, a roll wound around a winder is processed with a cutter and a slitter into a large-size sheet, which is then further processed by guillotine cutting into a cut sheet of a desirable size, or a roll wound around a winder is processed with a cutter and a slitter into a roll with a desirable width, which is then further processed with a cutter or a slitter into a cut sheet or a roll sheet with a desirable width.

On the other hand, during conveyance of a recording medium, the magnetic material may separate from the surface, because external stress, such as friction in contact for example with conveyor unit material, is applied on the recording medium surface.

Accordingly, the magnetic material is preferably not exposed on the surface of the recording medium according to an exemplary embodiment of the present invention. When the magnetic material is exposed on the recording medium surface, the magnetic material may separated from the surface during conveyance of the recording medium. In addition during image formation in the electrophotographic process, a recording medium carrying the magnetic material exposed on the surface may cause leakage during passage through the transfer unit. The magnetic material is particularly preferably not exposed on both surfaces of the recording medium. Exposure of the magnetic material on recording medium surface is easily evaluated by visual observation.

For more reliable prevention of the separation of the magnetic material from the recording medium surface and the leakage during image formation in the electrophotographic process, the minimum of shortest distances between the recording medium surface and the magnetic material is preferably 5 μm or more, or about 5 μm or more, more preferably 8 μm or more, or about 8 μm or more. The minimum of the shortest distances between the recording medium surface and the magnetic material is preferably as long as possible, but practically, most preferable is a case where the magnetic material is located almost in the central area in the recording medium thickness direction.

Hereinafter, the method of determining the shortest distance between the recording medium surface and the magnetic material present in the recording medium (unexposed on the surface) will be described. First, for measurement of the distance of the magnetic material to the top and bottom faces of the recording medium, a cross section of the recording medium containing the magnetic material is prepared. The preparative method for the cross-sectional observation sample is not particularly limited, and any cutting method may be used if it does not cause dimensional change, and examples thereof include resin impregnation method, cutting method, freeze fracture method, and the like.

The method of determining the distance between the recording medium surface and the magnetic material is not particularly limited, if it allows observation of the cross-sectional shape of the recording medium and measurement of the distance to the top and bottom faces of the recording medium, and examples thereof include methods of using an optical microscope, scanning electron microscope (SEM), transmission electron microscope (TEM), or the like. Preferably, the distance is measured by using a SEM at a magnification of 100 to 1,000 times.

When the distance between the top or bottom surface of recording medium and the magnetic material is to be determined from the cross-sectional image obtained for example by SEM observation, the cross section is binarized into a pulp layer and a non-pulp layer (magnetic material) with image-processing software (for example, DIPP-98, manufactured by Detect Co., Ltd.) [for the binarization method, see "Automatic threshold level-selecting method, based on judgment and least square standard" (J. Institute of Electronics, Information and Communication Engineers, Vol. J63-D, No. 4, pp. 349 to 356), "Basis and application of digital image processing" (Koichi Sakai)], and the shortest distance between the recording medium surface and the magnetic material is determined.

The shape of the magnetic material for use in an exemplary embodiment of the present invention is not particularly limited, but a linear magnetic material having a length of several millimeters or more (hereinafter, referred to as "magnetic wire rod") is used favorably. Thus for measurement, cross-sectional observation samples were prepared by cutting a magnetic wire rod in the regions at both edges and at the center. Specifically, the shortest distance between the individual magnetic wire rod and the recording medium surface was the shortest distance from both faces of the recording medium to the magnetic wire rod.

During measurement, five magnetic materials contained in a recording medium were selected and the shortest distances were measured over 50 recording media (at a total of 250 positions). However, when there were less than five magnetic materials contained in the recording medium, a particular number of recording media were measured additionally, to make a total number of 250 positions. The minimum was obtained from the observed values at the 250 positions.

Figure 2:
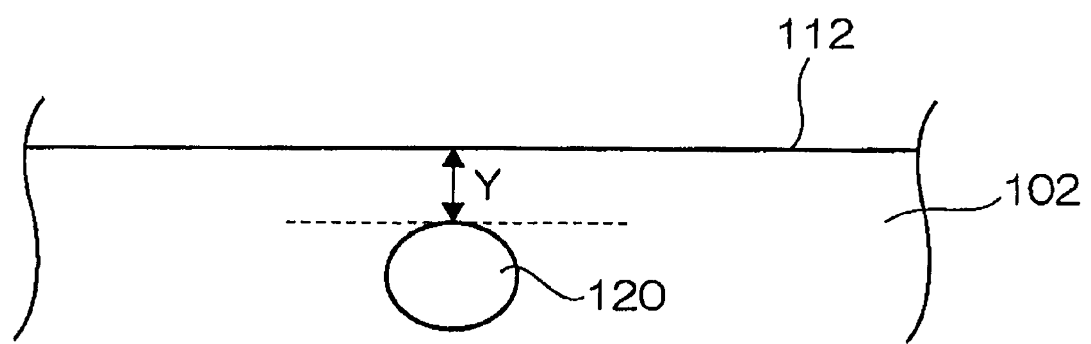
FIG. 2 is a schematic view illustrating the method of determining the shortest distance between the recording medium surface and the magnetic material.

FIG. 2 is a schematic view explaining the method of determining the shortest distance between the recording medium surface and the magnetic material, wherein 102 represents the cross section of the recording medium; 112, the recording medium surface; and 120, the magnetic material. As shown in the Figure, the shortest distance between the recording medium surface and the magnetic material measured is the straight-line distance shortest between the region of the magnetic material 120 closest to the recording medium surface 112 and the recording medium surface 112 (distance indicated by an arrow Y).

Hereinafter, the configuration of the recording medium according to an exemplary embodiment of the present invention will be described in detail.

The recording medium according to an exemplary embodiment of the present invention at least contains a pulp-fiber and a magnetic material, and has a paper substrate containing a pulp-fiber as the principal component. A surface layer may be formed as needed at least on one side of the paper substrate. When the recording medium has multiple layers, the magnetic material may be contained in any layer, but normally, preferably in the paper substrate.

The magnetic material for use in an exemplary embodiment of the present invention particularly preferably has Large Barkhausen Effect.

Figure 3A:
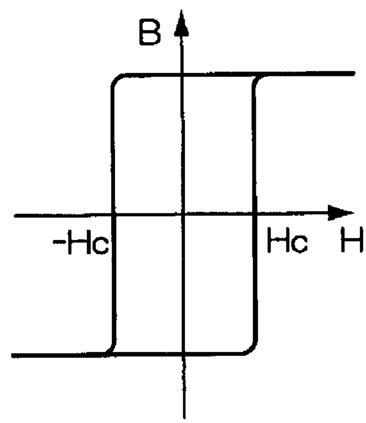
FIG. 3A is a chart explaining Large Barkhausen Effect.

Hereinafter, the Large Barkhausen Effect will be described briefly. FIG. 3 show charts explaining the Large Barkhausen Effect. The Large Barkhausen Effect is a phenomenon of the drastic magnetic flux reversal that occurs when a material having B-H characteristics, i.e., having an almost rectangular hysteresis loop shown in FIG. 3A and a relatively smaller coercive force (Hc), for example, amorphous magnetic material of Co—Fe—Ni—B—Si, is placed in an alternating magnetic field. Thus, when an alternating magnetic field is generated by supplying an alternating current to an excitation coil and a magnetic material is placed in the alternating magnetic field, a pulse current flows in a detecting coil placed close to the magnetic material during magnetization reversal.

Figure 3B:
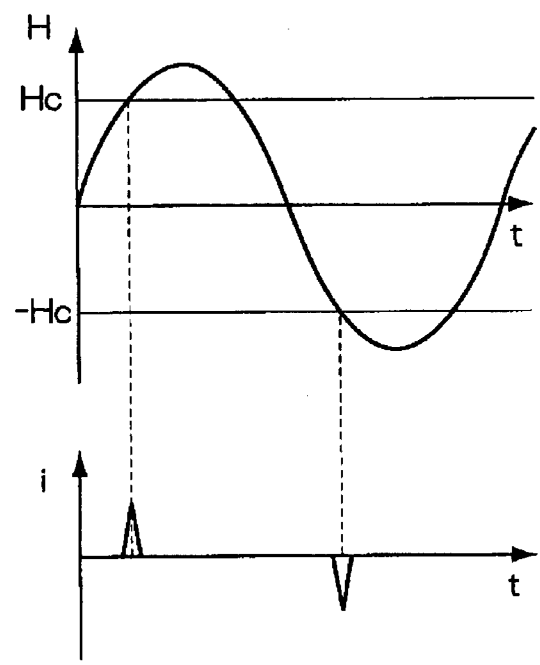
FIG. 3B is a chart explaining Large Barkhausen Effect.

For example when an alternating magnetic field shown in the top column of FIG. 3B is generated with an excitation coil, if a recording medium is placed in the alternating magnetic field generated, a pulse current shown in the bottom column of FIG. 3B flows in the detecting coil.

The magnetic materials for use in an exemplary embodiment of the present invention generally include permanent magnets such as rare-earth metal magnets containing neodymium (Nd), iron (Fe) and boron (B) as principal materials, those containing samarium (Sm) and cobalt (Co) as principal materials, AlNiCo magnets containing aluminum (Al), nickel (Ni) and cobalt (Co) as principal materials, ferrite magnets containing barium (Ba) or strontium (Sr) and iron oxide ($Fe_2O_3$) as principal materials, as well as soft magnetic materials, oxide soft magnetic materials, and the like. Amorphous magnetic materials having Fe—Co—Si or Co—Fe—Ni as basic composition are favorably used as the magnetic materials having the Large Barkhausen Effect.

The shape of the magnetic material is not particularly limited, if it is suitable for the Large Barkhausen Effect, but, because a particular ratio of the length to the sectional area is needed for Large Barkhausen Effect, the shape is preferably linear (wire) or belt, more preferably wire.

When the magnetic material is wire-shaped, the minimum diameter needed for showing Large Barkhausen Effect is preferably 20 μm or more, or about 20 μm or more, as described above. The maximum diameter is not particularly limited, but the diameter favorable for preventing exposure of the magnetic material on the recording medium surface depends on the thickness of the recording medium, and thus, the maximum diameter is preferably 60 μm or less, or about 60 μm or less, more preferably 50 μm or less, or about 50 μm or less, for example when a recording medium having a thickness of about 100 μm is used.

Alternatively, the minimum length is preferably at least 10 mm or more, or about 10 mm or more for Large Barkhausen Effect. The maximum length of the magnetic material is not particularly limited, if the material is not exposed when contained inside, but preferably 350 mm or less, or about 350 mm or less. For prevention of separation of the magnetic material from the edges of the recording medium, the length is preferably 10 mm or more, or about 10 mm or more.

The material for the paper substrate is not particularly limited, if it is a material processable into a sheet having a thickness suitable for image-forming apparatuses that record an image on a recording medium for example in the electrophotographic or inkjet-printing process, such as pulp-fiber.

The pulp-fiber, the main raw material for the paper substrate, is not particularly limited, and examples thereof include hardwood and/or softwood tree Kraft pulp-fibers, sulfite pulp-fibers, semichemical pulp-fibers, chemiground pulp-fibers, ground-wood pulp-fibers, refiner ground pulp-fibers, thermomechanical pulp-fibers, and the like. Cellulose or hemicellulose in these fibers may also be used as needed after chemical modification.

In addition, various fibers, such as cotton pulp-fiber, hemp pulp-fiber, kenaf pulp-fiber, bagasse pulp-fiber, viscose rayon fiber, regeneration cellulosic fiber, copper ammonia rayon fiber, cellulose acetate fiber, polyvinyl chloride fiber, polyacrylonitrile fiber, polyvinylalcohol fiber, polyvinylidene chloride fiber, polyolefin fiber, polyurethane fiber, fluorocarbon fiber, glass fiber, carbon fiber, alumina fiber, metal fiber, and silicon carbide fiber may be used alone or in combination of two or more.

Alternatively as needed, a fiber obtained by impregnation or thermal fusion of the pulp-fiber with a synthetic resin such as polyethylene, polypropylene, polystyrene, polyvinyl chloride, or polyester may be used.

Yet alternatively, recycled fiber from the woodfree paper or mechanical woodpulp paper may be blended to the pulp-fiber. The blending rate of the recycled fiber is determined according to application and purpose. From the viewpoint of resource preservation, use of pulp from the chip of the wood certified by so-called the forest certification tree, plantation tree, or thinned wood is preferable.

A filler may be added for adjustment of the opaqueness, whiteness, and surface smoothness of the recording medium according to an exemplary embodiment of the present invention.

However, the blending rate of the filler with respect to the solid matter in the recording medium (absolute dry weight) is preferably 20 wt % or less, or about 20 wt % or less, more preferably 10 wt % or less, or about 10 wt % or less, and still more preferably 5 wt % or less, about 5 wt % or less, for preservation of the bonding force among the pulp-fibers contained in the recording medium and prevention of separation of the magnetic material.

A filler blending amount of more than 20 wt %, or about 20 wt % with respect to the solid matter in paper substrate easily leads to breakage of the bonds formed among the materials such as pulp-fiber and elongation of the distance among pulp-fiber constituting the paper substrate, and thus to deterioration in the bonding strength among the main materials constituting the paper substrate and also to occasional separation of the magnetic material from the recording medium.

The filler blending amount can be determined by ashing the recording medium according to an exemplary embodiment of the present invention by the method specified in JIS P 8128 (575° C., 4 hours), performing elemental analysis of the residual ash (ash specified in JIS P 8128) for example by IPC emission spectroscopy, and calculating the blending rates of the magnetic material and the filler contained in the paper substrate of recording medium.

Examples of the fillers for use in the recording medium according to an exemplary embodiment of the present invention include inorganic fillers including ground heavy calcium carbonate, precipitated calcium carbonate, silicates (such as kaolin, calcined clay, pyroferrite, sericite, and talc), and titanium dioxide; organic pigments such as urea resin and styrene; thermoplastic resin particles such as of polyester and styrene acrylic; and the like.

In addition, various chemicals such as sizing agent may be added internally or externally to the paper substrate for the recording medium according to an exemplary embodiment of the present invention.

Examples of the sizing agents favorably added to the paper substrate include rosin-based sizing agents, synthetic sizing agents, petroleum resin-based sizing agents, neutral sizing agents, and the like. A fixing agent such as aluminum sulfate or cationized starch may be used.

Among the sizing agents above, neutral sizing agents such as alkenyl succinic anhydride-based sizing agents, alkylketene dimers, alkenyl ketene dimers, neutral rosins, petroleum oil sizes, olefinic resins, and styrene-acrylic resin are favorable, from the viewpoint of the storage life of the recording medium after image formation for example in an image-forming apparatus in the electrophotographic or inkjet-printing process. In addition, oxidatively modified starches, enzyme-modified starches, polyvinylalcohol, cellulose derivatives such as carboxymethylcellulose, styrene acrylic latex, styrene maleic acid latex, acrylic latex, and the like may be used alone or in combination as the surface sizing agent.

In addition, paper-strength additives may be added internally or externally to the paper substrate for the recording medium according to an exemplary embodiment of the present invention.

Examples of the paper-strength enhancers include starch, modified starches, vegetable gum, carboxymethylcellulose, polyvinylalcohol, modified polyvinylalcohols, polyacrylamide, styrene-maleic anhydride copolymers, vinyl chloride-vinyl acetate copolymers, styrene-butadiene copolymers, polyacrylic ester copolymers, urea-formaldehyde resins, melamine-formaldehyde resins, dialdehyde starch, polyethyleneimine, epoxidized polyamides, polyamide-epichlorohydrin resins, methylolated polyamides, chitosan derivatives, and the like, and these materials may be used alone or in combination.

In addition, various common additives used in common paper medium such as dye and pH adjuster may be used as needed.

In preparing the recording medium according to an exemplary embodiment of the present invention, it is possible to prepare a recording medium having a desirable layer structure, by properly selecting the paper-making method and the order of the materials for the paper substrate and forming a surface layer as needed. For example, it is possible to prepare a paper substrate by mixing the materials described above for the paper substrate such as pulp-fiber into a stock slurry, sheeting the slurry into a paper substrate layer, dispersing a magnetic material on one side of the paper substrate, and laminating another paper substrate layer on the surface containing the magnetic material, and additionally, as needed, by forming a surface layer on the surface of the paper substrate.

Alternatively, a single-layered paper substrate may be prepared by sheeting a stock slurry containing a material for paper substrate such as pulp-fiber and a magnetic material, and additionally, a surface layer may be formed on the surface of the paper substrate as needed. Yet alternatively, a paper substrate layer prepared by sheeting with a stock slurry containing no magnetic material may be laminated on both faces of a paper substrate layer containing a magnetic material, forming a paper substrate in a three-layer structure, and a surface layer may be formed additionally on the surface of the paper substrate as needed. In this way, a paper substrate may be first formed by using a multilayer sheet, and then a surface layer formed thereon, to give a recording medium.

The recording medium according to an exemplary embodiment of the present invention may be a single-layered paper substrate in a single-layer structure, but preferably has two or more layers. In such a case, the paper substrate itself may have two or more layers; a surface layer may be formed on one face or both faces of the paper substrate; and the configuration in combination of the two is also favorable.

When the paper substrate has two or more layers, the magnetic material is preferably placed at the interface of the layers, for prevention of exposure of the magnetic material out of the recording medium surface and for containment of the magnetic material in the region inside the recording medium surface. Alternatively when the paper substrate has three or more layers, the magnetic material may be placed in a layer of the paper substrate except the outermost layer or may be placed at the interface of layers, for containment of the magnetic material in the region inside the recording medium surface.

Formation of a surface layer is also favorable, particularly when the paper substrate has a single-layer structure, for prevention of exposure of the magnetic material out of the recording medium surface and for containment of the magnetic material in the region inside the recording medium surface.

As described above, the layer structure in the thickness direction of recording medium may be optimized by proper selection and combination of production processes.

On the other hand, in the recording medium according to an exemplary embodiment of the present invention, the region separated from the edge of the recording medium parallel to the pulp-fiber orientation direction by a shortest distance of less than about 1 mm should contain no magnetic material for prevention of separation of the magnetic material. Accordingly, in preparing the recording medium according to an exemplary embodiment of the present invention, it is important to control the blending position of the magnetic material in the recording medium planar direction (direction perpendicular to the pulp-fiber orientation direction).

For example, by controlling the concentration of the magnetic material in the stock slurry ejected from the multiple nozzles placed along the direction crossing the pulp-fiber orientation direction (sheeting wire traveling direction) and the flow rate of the stock slurry ejected from each nozzle, or by adjusting the position of the nozzle distal region in the wire width direction, it is possible to control the blending position of the magnetic material in the wire width direction.

In this way, it is possible to obtain, as a sheet before processing in the cutting step, a sheet (large-size dry sheet) a magnetic material and a pulp-fiber oriented in a planar direction of the sheet, and comprising a first region including the magnetic material and a second region not including the magnetic material, the respective regions extending in a belt-shape in a direction parallel to the pulp-fiber orientation direction and being formed alternately in a direction perpendicular to the pulp-fiber orientation direction, the width of a second region formed between two neighboring first regions being 2 mm or more, and to distribute the magnetic materials within a particular width at particular positions according to the size of the recording medium prepared, such as A or B trimmed size series.

In cutting the large-size dry sheet described above, it is possible to obtain the recording medium according to an exemplary embodiment of the present invention, by cutting the belt-shaped region (second region) containing no magnetic material in such a manner that the shortest distance from the cutting line to the belt-shaped region containing the magnetic material (the first region) remains about 1 mm or more. Instead of cutting the large-size dry sheet it is also possible to make the user use the recording medium according to an exemplary embodiment of the present invention by cutting it along a perforated tear or cut line by forming the perforated tear line or cut line.

Figure 4:
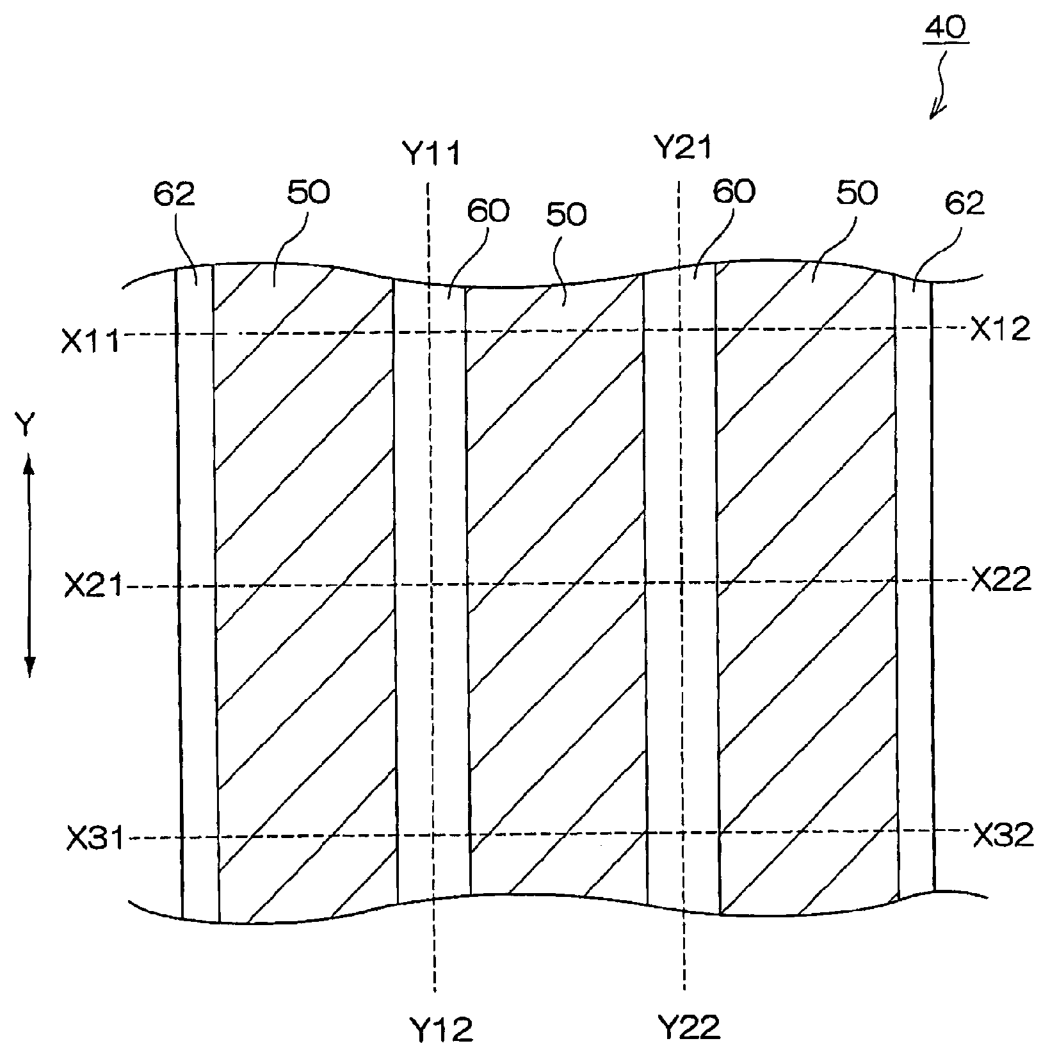
FIG. 4 is a schematic view illustrating an example of the sheet according to an exemplary embodiment of the present invention.

FIG. 4 is a schematic view illustrating an example of the sheet according to an exemplary embodiment of the present invention, wherein the arrow Y represents the pulp-fiber orientation direction; 40 represents a sheet; 50 represents a first region containing a magnetic material; 60 represents a second region containing no magnetic material; 62 represents a belt-shaped region containing no magnetic material formed along the edge of the recording medium parallel to the arrow Y direction in sheet 40 (hereinafter, referred to as "non-magnetic material-containing region at edge"); and dotted lines Y11-Y12, Y21-Y22, X11-X12, X21-X22, and X31-X32 in the Figure represent cutting lines.

The sheet 40 shown in FIG. 4 has a non-magnetic-material-containing region 62 at edge, a first region containing a magnetic material 50, a second region containing no magnetic material 60, a first region 50, a second region 60, a first magnetic material-containing region 50, and a non-magnetic-material-containing region 62 at edge formed in that order in the direction perpendicular to the pulp-fiber orientation direction Y (in the code X21-X22 direction), and the width of the second region containing no magnetic material 60 in the code X21-X22 direction is 2 mm or more, and the width of the non-magnetic-material-containing region 62 at edge in the code X21-X22 direction is 1 mm or more. In preparing a recording medium by cutting the sheet 40, the recording medium is cut along the cutting lines indicated by the dotted line in the Figure. The cutting lines Y11-Y12 and Y21-Y22, which divide the second region containing no magnetic material 60 into two regions, are drawn in such a manner that the shortest distance from these cutting lines to the first region 50 becomes 1 mm or more.

The paper making method used in preparation of the recording medium according to an exemplary embodiment of the present invention is not particularly limited. For example, any one of multilayer paper-making methods and known Fourdrinier paper machine, cylinder paper machine, twin wire method, and the like may be used. An acidic or neutral paper making method may be used.

Any one of the cylinder paper making, fourdrinier, fourdrinier/cylinder combination, multi-head box, and tanmo/fourdrinier methods may be used as the multilayer paper making method; any one of the methods described in detail, for example in Saburo Ishiguro, "Newest paper-making technology—Theory and application" (Seishi Kagaku Kenkyusho, 1984) may be used; and a multi-cylinder paper making method is also favorable.

In preparing the recording medium according to an exemplary embodiment of the present invention, a coating solution may be coated on the surface of the paper substrate. The adhesive contained in the coating solution for use is a polymer compound water-soluble and/or water-dispersible, and examples thereof include starches such as cationic starch, amphoteric starch, oxidized starch, enzyme-modified starch, thermochemically modified starch, esterified starch, and etherified starch; cellulose derivatives such as carboxymethylcellulose and hydroxyethylcellulose; natural or semisynthetic polymer compounds such as gelatin, casein, soy bean protein, and natural rubber; polyvinylalcohol, polydienes such as isoprene, neoprene, and polybutadiene; polyalkenes such as polybutene, polyisobutylene, polypropylene, and polyethylene; vinyl polymers and copolymers such as vinyl halide, vinyl acetate, styrene, (meth)acrylic acid, (meth) acrylic ester, (meta)acrylamide, and methyl vinylether; synthetic rubber latexes such as of styrene-butadiene-based and methyl methacrylate-butadiene-based latexes; synthetic polymer compounds such as polyurethane resin, polyester resin, polyamide resin, olefin-maleic anhydride resin, and melamine resin; and the like. These adhesives may be used alone or in combination, and the favorable examples are not limited thereto. However, from the point of production cost, use of cheaper starch is preferable.

Examples of the pigments contained in the coating solution include mineral pigments such as ground calcium carbonate, precipitated calcium carbonate, kaolin, calcined kaolin, structured kaolin, delaminated kaolin, talc, calcium sulfate, barium sulfate, titanium dioxide, zinc oxide, alumina, magnesium carbonate, magnesium oxide, silica, magnesium aluminosilicate, fine-particle calcium silicate, fine-particle magnesium carbonate, fine-particle precipitated calcium carbonate, white carbon, bentonite, zeolite, sericite, and smectite; organic pigments such as polystyrene resin, styrene-acryl resin copolymer, urea resin, melamine resin, acrylic resin, vinylidene chloride resin, benzoguanamine resin and ultrafine hollow particles and through-hole particles thereof; and the like, and these materials are used alone or in combination of two or more.

The blending rate of the adhesive to the pigment in the coating solution is preferably in a range of from 5 to 50 parts by weight, or about 5 to about 50 parts by weight with respect to 100 parts by weight of the pigment. An adhesive blending rate of less than 5 parts by weight, or about 5 parts by weight with respect to 100 parts by weight of the pigment causes a problem of giving a surface layer having lower coating layer strength and generating dust. Alternatively, an adhesive blending rate of more than 50 parts by weight, or about 50 parts by weight with respect to 100 parts by weight of the pigment causes a problem of increase in production cost due to use of excessive adhesive and of low practical performance.

The resin for use for the surface layer is not particularly limited if it is a known thermoplastic resin, and examples thereof include ester-bond-containing resins; polyurethane resins; polyamide resins such as urea resin; polysulfone resins; polyvinyl chloride resins, polyvinylidene chloride resins, vinyl chloride-vinyl acetate resin copolymers, vinyl chloride-vinyl propionate copolymer resins; polyol resins such as polyvinylbutyral; cellulosic resins such as ethylcellulose resin and cellulose acetate resin; polycaprolactone resins, styrene-maleic anhydride resins, polyacrylonitrile resins, polyether resins, epoxy resins, phenol resins; polyolefin resins such as polyethylene resin and polypropylene resin; copolymer resins of an olefin such as ethylene, propylene or the like with another vinyl monomer; acrylic resins, and the like.

From the viewpoint of film-forming capability, use of a polyvinylalcohol having a saponification value of 90 mol % or more, or about 90 mol % or more, a modified polyvinylalcohol, a styrene-maleic anhydride copolymer, a vinyl chloride-vinyl acetate copolymer, a styrene-butadiene copolymer, a polyacrylic ester, or the like is favorable in the coating solution.

Various assistants or aids such as surfactant, pH adjustor, viscosity adjustor, softener, glossifier, dispersant, thixotropic agent, anti-conductive agent, stabilizer, antistatic agent, crosslinker, antioxidant, sizing agent, fluorescent brightener, colorant, ultraviolet absorbent, antifoaming agent, water repellent, plasticizer, lubricant, antiseptic agent, and flavoring agent may be added additionally as needed to the coating solution.

In forming the surface layer above, the coating solution is coated on a paper substrate, for example, by using a generally known coated apparatus such as size press, blade coater, air knife coater, roll coater, reverse roll coater, bar coater, curtain coater, die coater, gravure coater, champlex coater, brush coater, two-roll or metering blade-type size press coater, Bullbradel coater, short-dwell coater, or gate roll coater.

It may be possible to form a surface layer on the paper substrate surface by applying the coating solution on a paper substrate surface by the application method above. The coating amount on one side of the paper substrate is preferably in a range of from 0.3 to about 20 $g/m^2$, or from about 0.3 to about 20 $g/m^2$, more preferably in a range of from 0.3 to 8 $g/m^2$, or from about 0.3 to about 8 $g/m^2$as dry mass, and still more preferably in a range of from 0.6 to 3.0 $g/m^2$, or from about 0.6 to about 3.0 $g/m^2$ considering the production cost.

A coating amount of less than 0.3 $g/m^2$, or about 0.3 $g/m^2$ leads to deterioration in the strength of the recording medium surface and separation of the magnetic material present in the region close to the surface. A coating amount of more than 20 $g/m^2$ or about 20 $g/m^2$ leads to tackiness especially under high-humidity environment and may cause conveying trouble during conveyance of the recording medium in the image-forming apparatus.

When a surface layer is formed on the paper substrate surface, it may be formed on one side or both sides of the recording medium. The surface layer may be a single layer or has a multi-layer structure having two or more layers. When a surface layer is formed on both face of the recording medium or when a surface layer in a multilayer structure is formed thereon, the amounts of the coating solutions used in forming respective surface layers may not be the same as each other, and may vary according to the amount and composition, and are selected properly according to the desirable quality level.

In forming a surface layer, the surface layer is preferably formed on both faces of the recording medium for prevention of curling.

When the recording medium according to an exemplary embodiment of the present invention has a surface layer, it is preferable to form the surface layer and then smoothen the surface layer, for example, by using a flat finishing apparatus such as of super calendering, gloss calender, or soft calender. The surface layer may be smoothened by on-machine or off-machine calendering, and the shape of pressure apparatus, the number of pressure nips, roll-heating temperature, and others are also adjusted properly, similarly to common smoothening apparatuses.

For example for dispersion of a magnetic material between two paper substrate layers, used is a method of forming an adhesive layer on one surface of at least one paper substrate layer, spreading a magnetic material alone on the adhesive layer, and bonding another paper substrate layer to the magnetic material-carrying surface, or a method of coating an adhesive containing a previously dispersed magnetic material on one surface of a paper substrate layer and bonding another paper substrate layer thereto. A surface layer may be formed as needed after the paper substrate layers are bonded to each other in this way.

Examples of the adhesive for use in the adhesive layer include aqueous and solvent-based adhesives (such as starch, modified starch, PVA, carboxymethylcellulose, and urethane-based, polyester-based, epoxy-based, rubber-based, cyanoacrylate-based, and emulsion-based adhesives), and use of a polyester-based adhesive is particularly preferable from the point of using safety. Alternatively, a double-faced adhesive tape may be used.

The surface resistivity of the recording medium according to an exemplary embodiment of the present invention is not particularly limited, but, in forming an image in the electrophotographic process, the recording medium preferably satisfies the requirements in properties as an electrophotographic transfer paper, and thus, the surface resistivity thereof is preferably in a range of about $1\times10^{9}$ Ω/square to about $5\times10^{11}$ Ω/square. The surface resistivity is determined according to JIS K6911 after the pretreatment in the test environment specified in JIS P8111.

For adjustment of the surface resistivity, used is a conductive substance, for example, an inorganic material such as sodium chloride, potassium chloride, calcium chloride, sodium sulfate, zinc oxide, titanium dioxide, tin oxide, aluminum oxide, or magnesium oxide, or an organic material such as alkylphosphoric ester, alkyl sulfuric ester, sodium sulfonate salt, or quaternary ammonium salt, and it is possible to control the surface resistivity of the recording medium to a desirable value, by adjusting the kind of the conductive substance and the addition amount thereof to the paper substrate. For environmental protection, a non-halogen conductive substance such as sodium sulfate is preferably used as the conductive substance.

The basis weight of the recording medium according to an exemplary embodiment of the present invention (JIS P 8124) is not specified here, but, preferably about 60 g/m$^2$ or more. A basis weight of less than about 60 g/m$^2$ may lead to deterioration in the stiffness of the recording medium. Accordingly, when an image is formed in an image-forming apparatus in the electrophotographic process, the recording medium may be adhered to a fixing member such as heating roll in the fixing device for fixing the toner image transferred on the recording medium surface, or there may be image defect caused by unfavorable separation of the recording medium from the fixing member.

Similarly, a basis weight of less than about 60 g/m$^2$ may result in exposure of the magnetic material contained in the recording medium on the surface or in easier separation of the magnetic material from the recording medium surface. In addition, when an image is formed, for example, in an electrophotographic or inkjet-printing process, the image may become less favorable in appearance because the magnetic material is more recognizable on the recording medium surface.

The water content of the recording medium according to an exemplary embodiment of the present invention is preferably adjusted, for example, during paper making in a paper machine, so that the water content of the product immediately after removal from a tightly sealed state in a moisture-proof packaging is stabilized in a suitable range, specifically preferably in a range of about 3 to about 6.5 wt %, more preferably about 4.5 to about 5.5 wt %. For prevention of water absorption or desorption of the prepared recording medium during storage, the recording medium prepared is preferably packaged with a moisture-proof packaging paper such as polyethylene laminate paper or a material such as polypropylene film, as a particular number of sheets are combined.

Hereinafter, the method of forming an image on the recording medium according to an exemplary embodiment of the present invention will be described, by taking image formation in the electrophotographic process as an example.

Figure 5:
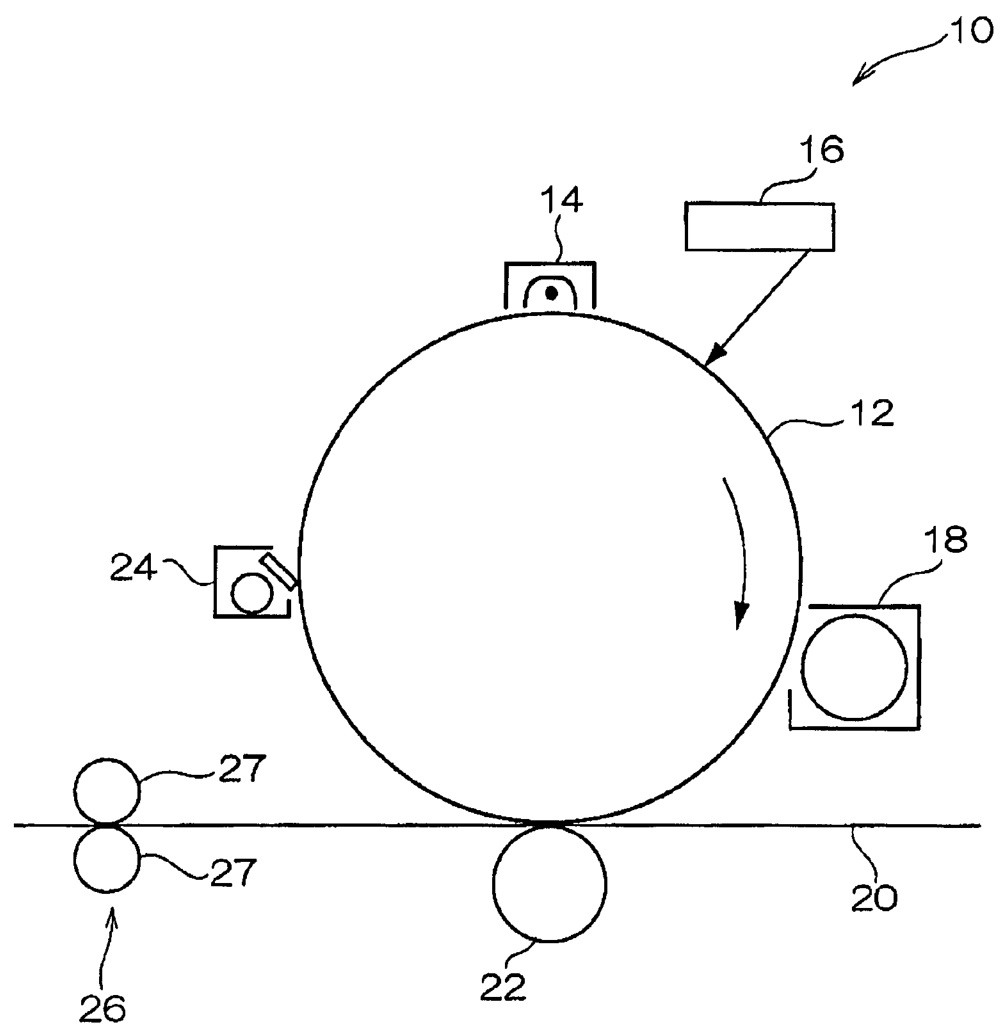
FIG. 5 is a schematic view illustrating an example of the image-forming apparatus in electrophotographic process.

FIG. 5 is a schematic view illustrating an example of the image-forming apparatus in the electrophotographic process, and as shown in FIG. 5, the image-forming apparatus 10 has an image carrier 12 revolving in a particular direction that carries an electrostatic latent image. It also has, around the image carrier 12 along the rotation direction of the image carrier 12, an electrostatically charging device 14, an exposure device 16, a developing device 18, a transfer device 22, and a cleaning device 24 in that order. The image-forming apparatus 10 also has a control unit (not shown in Figure) for control of various devices contained in the image-forming apparatus 10.

The transfer device 22 is a roll-shaped part and placed in contact under pressure with the image carrier 12. A recording medium 20 conveyed into the pressured area (in the transfer unit) between the transfer device 22 and the image carrier 12 by a conveying means not shown in the Figure passes through the transfer unit in the direction identical with the rotation direction of the image carrier 12.

There is a fixing device 26 having a pair of fixing rolls 27 that are in contact with each other under pressure and at least one of which contains an internal heat source, downstream of the transfer unit in the travelling direction of the recording medium 20, and the recording medium 20 supplied from the transfer unit passes through the region between the pair of fixing rolls 27 (pressuring region).

The electrostatically charging device 14 charges the surface of the image carrier 12 electrostatically. The exposure device 16 forms an electrostatic latent image on the image carrier 12 by irradiating a laser beam modulated according to image data inputted via an input/output unit not shown in the Figure from an external apparatus not shown in the Figure by wired or wireless communication onto the image carrier 12 by scanning. The developing device 18 develops the electrostatic latent image formed on the image carrier 12 with a toner, forming a toner image on the image carrier 12. The transfer device 22 holds and conveys the recording medium 20 together with the image carrier 12, transfers the toner image formed on the image carrier 12 onto the recording medium 20 by application of a transfer voltage from a power source not shown in the Figure. The cleaning device 24 removed the toner remaining on the image carrier 12. The fixing device 26 fixes the toner image transferred on the recording medium 20.

The fixing device 26 fixes the toner image on the recording medium 20 surface, by pressurizing the recording medium 20 carrying the transferred toner image that is passing through the pressuring region under heat. The fixing is preferably performed by oil-less fixing. The oil-less fixing is a fixing method of using a fixing roll 27 having no releasing agent such as oil on the surface during fixing. When in oil-less fixing, the fixing device 26 does not demand a supply device for supplying a releasing agent to the fixing roll 27 surface.

Any known toner may be used as the toner used for image formation, but normally, a toner containing a colorant and a binder resin such as polyester resin or styrene-acrylic resin is used. When used in oil-less fixing, the toner contains a releasing agent additionally. The method of producing the toner for use is not particularly limited, and any one of known production methods including pulverization, polymerization, and others may be used.

During image formation, the image carrier 12 surface is first electrostatically charged uniformly by the electrostatically charging device 14, and then, a laser beam is scan-irradiated by the exposure device 16. An electrostatic latent image is formed on the image carrier 12 surface by scanning and irradiation with the laser beam. The electrostatic latent image formed on the image carrier 12 is developed by the developing device 18, when it reaches the region facing the installation position of the developing device 18 by revolution of the image carrier 12. A toner image corresponding to the electrostatic latent image is formed on the image carrier 12 by development by the developing device 18 (hereinafter, referred to as developing step).

The recording medium 20 is supplied from a recording medium container not shown in the Figure, along the conveyance route (not shown in Figure) in the image-forming apparatus 10 by conveying devices such as various conveyor rolls not shown in the Figure, to the pressurization region (transfer unit) between the image carrier 12 and the transfer device 22. When the region on image carrier 12 surface where the toner image is formed reaches the transfer unit and the recording medium 20 is held and conveyed in the space between the image carrier 12 and the transfer device 22, the toner image on the image carrier 12 is transferred onto the recording medium 20.

The toner image is transferred onto the recording medium 20 by application of voltage from a power source not shown in the Figure to the roll-shaped transfer device 22. When the voltage is applied to the transfer device 22, an electric field forcing migration of the toner on the toner image formed on the image carrier 12 in the direction toward the recording medium 20 is generated between the image carrier 12 and the transfer device 22, and thus, the toner image on the image carrier 12 is transferred onto the recording medium 20 (hereinafter, referred to as transfer step).

The toner image transferred on the recording medium 20 is conveyed into the fixing device 26 by a conveying means not shown in Figure, where it is fixed on the recording medium 20 in the fixing device 26 (hereinafter, referred to as fixing step), giving an image on the recording medium 20. The image-formed recording medium 20 is discharged out of the image-forming apparatus 10 by a discharge roll not shown in the Figure.

EXAMPLES

Hereinafter, the present invention will be described more specifically with reference to Examples, but it should be understood that the present invention is not limited thereby.

Example 1

To a pulp slurry containing 85 parts by weight of LBKP (hardwood bleached Kraft pulp) and 15 parts by weight of NBKP (softwood bleached Kraft pulp), 3 parts by weight of a filler precipitated calcium carbonate (Tamapearl TP-121, manufactured by Okutama Kogyo Co., Ltd.), 0.10 part by weight of a cationized starch (trade name: MS4600, manufactured by Nihon Shokuhin Kagaku Kogyo Co., Ltd.) and 0.05 part by weight of an alkenyl succinic anhydride (Fiblan 81, manufactured by Japan NSC) are added, with respect to 100 parts by weight of the pulp solid matter.

The mixture is diluted with white water, to give a stock slurry at a solid matter concentration of 0.4%. Two wet sheets having a basis weight of 40 g/m$^2$ are made with the stock slurry by using Oriented Sheet Former (trade name: ORIENTED SHEET FORMER, manufactured by Kumagai Riki Kogyo) under the following paper-making condition.

<Paper-Making Condition>

Paper-making wire velocity: 1,200 m/min

Sample-spraying pressure: 1 kgf/cm$^2$

Stroke number: 7

Then, a magnetic material (composition: Fe—Co—Si) having a diameter of 30 μm and a length of 30 mm is placed on the surface of one sheet. The magnetic material is placed on the sheet surface in such a manner that it is located in the region separated by 1.5 mm or more in the direction perpendicular to the pulp-fiber orientation direction from the edge of the base parallel to MD direction of the sheet, as the basis for final cutting position.

Then, another sheet is placed on the surface carrying the magnetic material, and the laminated film of the two sheets is pressed under a pressure of 5 kgf/cm$^2$ on a square-sheet machine press (manufactured by Kumagai Riki Kogyo Co., Ltd.) for 10 minutes, dried in a rotary dryer (trade name: ROTARY DRYER DR-200, manufactured by Kumagai Riki Kogyo Co., Ltd.) at a drum temperature of 100° C. and a rotational velocity of 120 cm/min, and cut into a A4-sized paper substrate.

Then, a coating solution containing an oxidized starch (Ace A, manufactured by Oji Cornstarch Co., Ltd.), polyvinylalcohol having a saponification value of 99 mol % (PVA-117, manufactured by Kuraray Co., Ltd.), and sodium sulfate is coated on both faces of the paper substrate thus prepared, respectively to 0.6 g/m$^2$, 0.05 g/m$^2$ and 0.1 g/m$^2$ as dry weight on one side of the paper substrate and dried in a size pressing machine.

The film is smoothened to an Oken-type smoothness of 50 seconds in a calendering apparatus, to give a recording medium having a basis weight of 80 g/m$^2$.

The minimum value of the shortest distances between the edge of the base parallel to the pulp-fiber orientation direction and the magnetic material of the recording medium obtained is 1.5 mm, and the minimum value of the shortest distances between the recording medium surface and the magnetic material is 30 μm. The basis weight is determined according to the method of JIS P 8124.

Example 2

A recording medium is prepared in a similar manner to Example 1, except that, in placing the magnetic material on one sheet surface in Example 1, the magnetic material is placed on the sheet surface as separated by 1.0 mm or more in the direction perpendicular to the pulp-fiber orientation direction from the edge of the base parallel to MD direction of the sheet as the basis for final cutting position.

Example 3

A recording medium is prepared in a similar manner to Example 1, except that, in placing the magnetic material on one sheet surface in Example 1, the magnetic material is placed on the sheet surface as separated by 10 mm or more in the direction perpendicular to the pulp-fiber orientation direction from the edge of the base parallel to MD direction of the sheet as the basis for final cutting position.

Example 4

To a pulp slurry containing 85 parts by weight of LBKP (hardwood bleached Kraft pulp) and 15 parts by weight of NBKP (softwood bleached Kraft pulp), 3 parts by weight of a filler precipitated calcium carbonate (Tamapearl TP-121, manufactured by Okutama Kogyo Co., Ltd.), 0.10 part by weight of a cationized starch [trade name: MS4600, manufactured by Nihon Shokuhin Kagaku Kogyo Co., Ltd.)], and 0.05 part by weight of an alkenyl succinic anhydride (Fiblan 81, manufactured by Japan NSC) are added with respect to 100 parts by weight of the pulp solid matter.

The mixture is diluted with white water, to give a stock slurry at a solid matter concentration of 0.4%. Two wet sheets having a basis weight of 10 g/m$^2$ are made with the stock slurry by using Oriented Sheet Former (trade name: ORIENTED SHEET FORMER, manufactured by Kumagai Riki Kogyo) under the following paper-making condition:

<Paper-Making Condition>
Paper-making wire velocity: 1,200 m/min
Sample spraying pressure: 1 kgf/cm$^2$
Stroke number: 2

A stock slurry containing 100 parts by weight of the stock slurry used in preparation of the first sheet and 2.5 parts by weight of the magnetic material used in Example 1 is prepared.

Then, a wet sheet (second sheet) having a basis weight of 60 g/m$^2$ is prepared with the stock slurry by using Oriented Sheet Former (trade name: ORIENTED SHEET FORMER, manufactured by Kumagai Riki Kogyo) under the following paper-making condition:

<Paper-Making Condition>
Paper-making wire velocity: 1,200 m/min
Sample spraying pressure: 1 kgf/cm$^2$
Stroke number: 11

Then, the second sheet and the first sheet are laid on one surface of the first sheet in that order, and the laminated film of three sheets is pressed and dried under a condition similar to Example 1, cut into a A4-sized sheet, and size-pressed, to give a recording medium.

Among the recording media obtained, media, wherein the magnetic material is separated by 1 mm or more in the direction perpendicular to the pulp-fiber orientation direction from the edge of the base parallel to the MD direction as the basis for final cutting position, are selected.

Example 5

A recording medium is prepared in a similar manner to Example 1, except that paper-making condition of the wet sheet in Example 1 is changed to the following condition: a magnetic material (composition: Fe—Co—Si) having a diameter of 20 μm and a length of 290 mm is used as the magnetic material, and the magnetic material is placed in the region separated by 2 mm or more in the direction perpendicular to the pulp-fiber orientation direction from the edge of the base in parallel with MD direction of the sheet as the final cutting position. The basis weight of the wet sheet obtained under the following paper-making condition is 45 g/m$^2$.

<Paper-Making Condition>
Paper-making wire velocity: 1,200 m/min
Sample spraying pressure: 1 kgf/cm$^2$
Stroke number: 7

Comparative Example 1

A recording medium is prepared in a similar manner to Example 1, except that in placing the magnetic material on one sheet surface in Example 1, the magnetic material is placed on the sheet surface as separated by 0.5 mm or more in the direction perpendicular to the pulp-fiber orientation direction from the edge of the base parallel to MD direction of the sheet as the basis for final cutting position.

Comparative Example 2

A recording medium is prepared in a similar manner to Example 4, except that the stroke number during sheeting of the first sheet is changed to 1 and the basis weight to 7 g/m$^2$.

Among the recording media obtained, media, wherein the magnetic material is separated by 0.5 to 0.6 mm in the direction perpendicular to the pulp-fiber orientation direction from the edge of the base parallel to the MD direction as the basis for final cutting position, are selected.

Comparative Example 3

A recording medium in a similar manner to Example 1, except that paper-making condition of the wet sheet in Example 1 is changed to the following condition: a magnetic material (composition: Fe—Co—B) having a diameter of 20 μm and a length of 290 mm is used as the magnetic material, and the magnetic material is placed on the sheet surface as separated by 0.5 mm or more in the direction perpendicular to the pulp-fiber orientation direction from the edge of the base parallel to MD direction of the sheet as the basis for final cutting position.

The basis weight of the wet sheet obtained under the following paper-making condition is 45 g/m$^2$.

<Paper-Making Condition>
Sheeting wire velocity: 1,200 m/min
Sample spraying pressure: 1 kgf/cm$^2$
Stroke number: 7

Comparative Example 4

A recording medium is prepared in a similar manner to Example 1, except that in placing the magnetic material on one sheet surface in Example 1, the magnetic material is placed on the sheet surface as separated by 0 mm or more in the direction perpendicular to the pulp-fiber orientation direction from the edge of the base parallel to MD direction of the sheet as the basis for final cutting position.

—Evaluation—

An image-forming test of the recording medium of each Example or Comparative Example is performed in an image-forming apparatus in the electrophotographic process.

The image-forming apparatus used is DocuCentreColor f450 (manufactured by Fuji Xerox Co., Ltd.); the fixing condition is in the plain paper mode (traveling velocity: 160 mm/s); a half tone image is formed continuously on the entire recording medium surface of 2,000 sheets; and separation of the magnetic material, image quality defect, and conveying trouble then are evaluated. Results are summarized in Table 1.

The separation of the magnetic material, image quality defect, and conveying trouble shown in Table 1 are evaluated in the following manner:

[Separation of Magnetic Material]

Separation of magnetic material is evaluated according to the following criteria, by examining the amount of the magnetic material deposited on the paper feed roll, transfer belt cleaner, and fixing roll in the apparatus after printing 2000 half-tone images.

A: No separation of magnetic material observed

B: Almost no separation of magnetic material observed

C: Some separation of magnetic material, causing practical problems

D: Distinctive separation of magnetic material observed

[Image Quality Defect]

TABLE 1

| | Magnetic material | | | | Position of the magnetic material in the planer and thickness directions of the recording medium | |
|---|---|---|---|---|---|---|
| | Composition | Length (mm) | Diameter (μm) | Large Barkhausen Effect | The minimum of the shortest distances between the terminal of the base in parallel with the pulp-fiber orientation direction and the magnetic material (mm) | The minimum of the shortest distances between the recording medium surface and the magnetic material (μm) |
| Example 1 | Fe—Co—Si | 30 | 30 | yes | 1.5 | 30 |
| Example 2 | Fe—Co—Si | 30 | 30 | yes | 1 | 30 |
| Example 3 | Fe—Co—Si | 30 | 30 | yes | 10 | 30 |
| Example 4 | Fe—Co—Si | 30 | 30 | yes | 1 | 6 |
| Example 5 | Fe—Co—Si | 290 | 20 | yes | 2 | 40 |
| Comparative example 1 | Fe—Co—Si | 30 | 30 | yes | 0.5 | 30 |
| Comparative example 2 | Fe—Co—Si | 30 | 30 | yes | 0.6 | 4 |
| Comparative example 3 | Fe—Co—B | 290 | 20 | yes | 0.5 | 40 |
| Comparative example 4 | Fe—Co—Si | 30 | 30 | yes | 0 | 30 |

| | Layer structure (basis weight: g/m$^2$) | Fiber orientation rate | Evaluation defect: Separation of magnetic material | Image quality defect | Conveying trouble |
|---|---|---|---|---|---|
| Example 1 | 2 layers (80) | 1.61 | A | A | A |
| Example 2 | 2 layers (80) | 1.60 | B | A | A |
| Example 3 | 2 layers (80) | 1.64 | A | A | A |
| Example 4 | 3 layers (80) | 1.58 | B | A | A |
| Example 5 | 2 layers (90) | 1.60 | A | A | A |
| Comparative example 1 | 2 layers (80) | 1.62 | D | D | D |
| Comparative example 2 | 3 layers (74) | 1.60 | D | D | D |
| Comparative example 3 | 2 layers (90) | 1.63 | C | D | D |
| Comparative example 4 | 2 layers (80) | 1.60 | D | D | D |

The image quality defect is evaluated according to the following criteria, by sampling an image immediately before the end of the half-tone-image-forming test (on about 2,000th sheet) and visually observing the image defect such as line and whitening due to separation of the magnetic material.

A: No image defect in sample

B: Slight image defect in sample

C: Distinctive image defect in sample

[Conveying Trouble]

The conveying trouble is evaluated according to the following criteria, by counting the number of conveying troubles such as wrong feeding during the continuous 2,000-sheet half-tone-image-forming test:

A: No conveying trouble

B: One or more and less than five conveying troubles

C: Five or more conveying troubles

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. A recording medium, comprising:

a magnetic material and a pulp-fiber, wherein the magnetic material is disposed within the pulp-fiber and a minimum value of shortest distances between the magnetic material and an edge of the recording medium substantially parallel to a pulp-fiber orientation direction of the pulp-fiber being about 1 mm or more, wherein the pulp-fiber orientation direction is a sheet forming wire traveling direction.

2. The recording medium according to claim 1, wherein the magnetic material is not substantially exposed at a surface of the recording medium.

3. The recording medium according to claim 1, wherein the minimum value of shortest distances between a surface of the recording medium and the magnetic material is about 5 μm or more.

4. The recording medium according to claim 1, wherein the minimum value of shortest distances between a surface of the recording medium and the magnetic material is about 8 μm or more.

5. The recording medium according to claim 1, wherein the magnetic material has a Large Barkhausen Effect.

6. The recording medium according to claim 5, wherein the magnetic material is a linear material with a circular cross-section having a length in a range of about 10 to about 350 mm and a diameter in a range of from about 20 to about 60 μm.

7. The recording medium according to claim 6, wherein the magnetic material is a linear material having a diameter in a range of from about 20 to about 50 μm.

8. The recording medium according to claim 5, wherein the magnetic material is a belt-shaped material.

9. The recording medium according to claim 1, wherein the magnetic material has a Fe—Co—Si-based amorphous magnetic material as its basic component.

10. The recording medium according to claim 1, wherein the magnetic material has a Co—Fe—Ni-based amorphous magnetic material as its basic component.

11. The recording medium according to claim 1, comprising two or more layers.

12. The recording medium according to claim 1, comprising two or more layers of the pulp-fiber, wherein the magnetic material is placed at an interface between the layers.

13. The recording medium according to claim 1, comprising a paper substrate of three or more layers of the pulp-fiber, wherein the magnetic material is contained in a layer other than an outermost layer, or is contained between the layers, of the paper substrate.

14. The recording medium according to claim 1, wherein the ratio of the ultrasonic propagation velocity in a pulp-fiber orientation direction to the ultrasonic propagation velocity in a direction perpendicular to the pulp-fiber orientation direction (ultrasonic propagation velocity in the pulp-fiber orientation direction /ultrasonic propagation velocity in the direction perpendicular to the pulp-fiber orientation direction) is about 1.1 or more.

15. The recording medium according to claim 1, wherein the pulp-fiber is impregnated or thermally fused with a synthetic resin selected from the group consisting of polyethylene, polypropylene, polystyrene, polyvinyl chloride, polyester.

* * * * *